3,052,604
GERMICIDAL COMPOSITION
Carl Henry Davis, Constantine G. Grand, and Vincent R. Saurino, Miami, Fla., assignors to Carlen Corporation, Wilmington, Del., a corporation of Delaware
No Drawing. Filed July 9, 1958, Ser. No. 747,359
3 Claims. (Cl. 167—58)

The present invention relates to a germicidal composition and in particular to a composition having especial utility as a surface disinfecting agent.

It is an object of the invention to provide a stable effective composition that exhibits a high order of germicidal effectiveness without the use of highly toxic, corrosive or allergenic components.

A particular object is to provide a composition that combines germicidal effectiveness with promotion of wound healing.

A specific object is to provide an antiseptic composition that is a synergistic mixture of a selected non-ionic surface agent of the polyoxyethylene alkylphenol class, sodium ethylene diamine tetraacetic acid, and a selected quaternary ammonium germicide.

The above and other objects will become apparent in the course of the following description.

The problem of controlling microbic infections of man and lower animals is an old one but one that seems to present new facets as our knowledge and techniques improve. In the treatment of surfaces to disinfect them or to control existing infection, the most effective compositions available have been based on highly toxic compounds, like mercurials, or corrosives, like iodine. These materials are usable only because an effective microbicidal concentration can be employed on a small area without reaching a dangerous total dosage. Such germicides are widely used for lack of safer reliable alternatives. Many of them also have an adverse effect on wound healing.

In recent times various antibiotic preparations have been used both as systemic medications and as topical remedies. The widespread use of antibiotics has revealed many instances of allergic reaction. More importantly, this use of antibiotics has resulted in the development of resistant virulent strains of common bacteria, notably *Micrococcus pyogenes* var. *aureus* and *Pseudomonas aeruginosa*. Infections with these organisms have become a wide and serious hospital problem.

There are also many cases in which pathogenic microbes are difficult to kill on skin surfaces or in wounds because of the existence of natural conditions protective to the pathogenic organism at the site of infection. The natural fat in the pores of the skin protects organisms in the pores. Some germicides coagulate blood serum and thereby give protection to bacteria in a wound.

The composition of the present invention has been found to have exceptionally good bactericidal properties and to be non-corrosive, non-toxic (for practical purposes) and non-allergenic. In particular, the composition has exhibited rapid and effective bactericidal action against the abovementioned resistant hospital strains of bacteria. This characteristic makes the composition of value at this time as a general antiseptic, particularly for hospital use.

In accordance with the invention three essential active components are combined in aqueous solution. The major active component is a polyoxyethylene alkylphenol in which the alkyl group has from 6 to 12 carbon atoms and the polyoxyethylene chain has from 6 to 20 oxyethylene groups. The preferred member of this group is polyoxyethylene nonylphenol containing 10 oxyethylene groups per mol.

The second component is sodium ethylene diamine tetra-acetic acid, preferably the tetrasodium salt of commerce.

The third component is a quaternary ammonium compound of the group of octyl aryloxy ethoxy ethyl dimethyl benzyl ammonium chlorides wherein the aryloxy group is phenoxy or cresoxy. The preferred component of this group is di-isobutyl phenoxy ethoxy ethyl dimethyl benzyl ammonium chloride.

The proportions of the components are from about 200 to 350 ml. of the first component, about 45 to 55 grams of the second component, about 0.75 to 1.25 grams of the third component, and distilled water to a volume of 1,000 ml.

The preferred composition at the present time is:

Polyoxyethylene nonyl phenol containing 10 oxyethylene groups per mol _____ml__ 350
Ethylene diamine tetra-acetic acid tetrasodium salt _____grams__ 50
Di-isobutyl phenoxy ethoxy ethyl dimethyl benzyl ammonium chloride, monohydrate _____grams__ 1
Distilled water to total 1,000 ml.

This product is prepared by first preparing a 10% solution of the sodium ethylene diamine tetra-acetic acid in distilled water. To this solution the liquid polyoxyethylene nonyl phenol is gradually added while stirring. After these are thoroughly mixed the quaternary ammonium compound is added and distilled water added to the indicated volume. After thorough mixing the product is permitted to stand until all bubbles have escaped before bottling.

The following table shows the results, in terms of killing time, of the above preferred composition (designated "A") on a variety of pathogenic organisms. Also shown are the comparable results for another composition according to the invention (designated "B") wherein the only difference resides in the use of di-isobutyl cresoxy ethoxy ethyl dimethyl benzyl ammonium chloride in place of the phenoxy homolog. For comparison the table gives results under the same test conditions for a widely used hospital antiseptic based on hexachloraphene (designated "C") and results obtained with phenol.

| Organism tested | Chemical comp. | Dilutions | | | |
|---|---|---|---|---|---|
| | | 100% | 1-5 | 1-10 | 1-100 |
| Micrococcus pyogenes var. aureus (FDA strain) | A | 15 sec | 3 min | 3 min | 9 min. |
| | B | 15 sec | 15 sec | 6 min | 15 min. |
| | C | Pos. 30 min | 9 min | 15 min | 30 min. |
| | Phenol | 1-70, 6 min | 1-80, 15 min | 1-90, 30 min | |
| Micrococcus pyogenes var. aureus (hospital strain from skin abcess) | A | 15 sec | 3 min | 6 min | Pos. 30 min. |
| | B | 15 sec | 3 min | 6 min | 30 min. |
| | C | Pos. 30 min | 30 min | 30 min | 30 min. |
| | Phenol | 1-70, 6 min | 1-80, 9 min | 1-90, 30 min | |
| Micrococcus pyogenes var. aureus (hospital nursery strain) | A | 15 sec | 15 sec | 3 min | 15 min. |
| | B | 15 sec | 15 sec | 3 min | Pos. 30 min. |
| | C | Pos. 30 min | 9 min | 15 min | 15 min. |
| | Phenol | 1-70, 9 min | 1-80, 9 min | 1-90, 30 min | |
| Streptococcus pyogenes Beta hemolytic | A | 15 sec | 15 sec | 15 sec | 9 min. |
| | B | 15 sec | 15 sec | 15 sec | 9 min. |
| Pseudomonas aeruginosa (ear infection) | A | 15 sec | 15 sec | 3 min | 15 min. |
| | B | 15 sec | 15 sec | 3 min | 30 min. |
| | C | Positive in all dilutions for 30 minutes | | | |
| | Phenol | 1-50, 15 min | 1-70, 30 min | 1-90, pos. 30 min | |
| Pseudomonas aeruginosa | A | 15 sec | 15 sec | 6 min | 30 min. |
| | B | 15 sec | 15 sec | 6 min | 30 min. |
| | C | All positive for 30 minutes | | | |
| | Phenol | 1-50, 15 min | 1-70, 30 min | 1-90, pos. 30 min | |
| Bacillus subtilis | A | 15 sec | 15 sec | 15 sec | 6 min. |
| | B | 15 sec | 15 sec | 15 sec | 9 min. |
| | C | Pos. 30 min | 15 min | 9 min | 30 min. |
| | Phenol | 1-60, 9 min | 1-80, 30 min | 1-90, pos. 30 min | |

The following table reports results obtained with Composition A and another group of pathogenic organisms. In each case the first observation was made after one minute so that a reported killing time of "1 min." means not more than one minute.

| Organism tested | Killing time dilutions | | |
|---|---|---|---|
| | 100% | 1-3 | 1-5 |
| | Min. | Min. | Min. |
| Bacillus anthracis | 1 | 3 | 9 |
| Aerobacter aerogenes | 1 | 3 | 9 |
| Escherichia coli | 1 | 1 | 9 |
| Streptococcus fecalis | 1 | 1 | 1 |
| Clostridium tetani | 1 | 3 | 6 |
| Neisseria catarrhalis | 1 | 1 | 1 |

The concentration given in the example is an effective and convenient one for dispensing. The bacteriological tests show that very rapid kills of resistant organisms are reliably obtained at full strength. Where the conditions of use permit longer contact with the infected site or surface to be disinfected the composition can be used in diluted form.

The composition according to the invention is particularly suitable for direct application to body surfaces for antiseptic treatment of wounds or surgical operating sites. It may also be used for the disinfection of instruments, tableware, linens, etc.

What is claimed is:

1. A germicidal composition for direct application to human and animal tissue surfaces, consisting essentially per 1,000 milliliters of about 200 to 350 milliliters of a polyoxyethylene alkyl phenol wherein the alkyl group has from 6 to 12 carbon atoms and the polyoxyethylene chain has from 6 to 20 oxyethylene groups, about 45 to 55 grams of sodium ethylene diamine tetra-acetic acid, about 0.75 to 1.25 grams of an octyl aryloxy ethoxy ethyl dimethyl benzyl ammonium chloride wherein the aryloxy group is selected from the group consisting of phenoxy and cresoxy, and distilled water to 1,000 milliliters volume.

2. A composition as in claim 1 wherein the polyoxyethylene alkyl phenol is polyoxyethylene nonyl phenol containing 10 oxyethylene groups per mol.

3. A germicidal composition for direct application to human and animal tissue surfaces consisting essentially per 1,000 milliliters of about 350 milliliters of polyoxyethylene nonyl phenol containing 10 oxyethylene groups per mol, about 50 grams of ethylene diamine tetra-acetic tetrasodium salt, about 1 gram of di-isobutyl aryloxy ethoxy ethyl dimethyl benzyl ammonium chloride wherein the aryloxy group is selected from the group consisting of phenoxy and cresoxy, and distilled water to 1,000 milliliters volume.

References Cited in the file of this patent

UNITED STATES PATENTS 2,524,219    Bersworth _____ Oct. 3, 1950
2,824,825    Fath et al. _____ Feb. 25, 1958

OTHER REFERENCES

Schwartz and Perry, Surface Active Agents, vol. 1, 1949, Interscience Publishers, Inc., N.Y., pages 188 and 452.

Sequestrene, Geigy Industrial Chemicals, 1952, pages 25 and 26.